Dec. 9, 1924.

C. D. SCHMIDT

ANTISKID DEVICE

Filed May 4, 1921

Inventor
Charles D. Schmidt
By his Attorneys
Edwards, Sager & Bower

Patented Dec. 9, 1924.

1,518,877

UNITED STATES PATENT OFFICE.

CHARLES D. SCHMIDT, OF JAMAICA, NEW YORK.

ANTISKID DEVICE.

Application filed May 4, 1921. Serial No. 466,817.

*To all whom it may concern:*

Be it known that I, CHARLES D. SCHMIDT, a citizen of the United States, residing at Jamaica, in the county of Queens and State of New York, have invented certain new and useful Improvements in Antiskid Devices, of which the following is a specification.

This invention relates to antiskid devices for vehicle wheels and particularly to antiskid devices adapted to extend completely around the wheel tread. The object of the invention is to provide an antiskid device formed of a number of similar units connected together in convenient manner permitting their easy assembly and disassembly and their rearrangement to present different parts of the chain for wear.

Further objects of the invention particularly in anchoring the chain to wheel spokes will appear from the following description taken in connection with the accompanying drawings in which—

Figure 1:
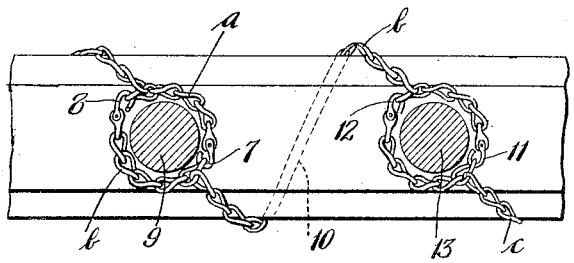
Fig. 1 is a diagrammatic view from the inside of a wheel illustrating one embodiment of the invention.

In all of the views the antiskid device is made up of an assembly of individual units each unit comprising a simple chain length with hooks at each end. In the embodiment of the invention shown in Fig. 1 a unit $a$ has one hook 7 engaging a second unit $b$ at an intermediate point and the hook 8 of the second unit $b$ similarly engages the unit $a$ at an intermediate point so as to form a loop around a spoke 9. The intermediate portion of each unit is then carried across the wheel tread as indicated at 10 and the unit $b$ has its end hook 11 connected with the intermediate point of the next succeeding unit $c$, the end hook 12 of which engages an intermediate link of the unit $b$, the ends of the units $b$ and $c$ forming a loop around the spoke 13 in a manner similar to the formation of the loop around spoke 9 by the ends of units $a$ and $b$. In this way the units may be carried completely around the wheel, being looped around successive spokes or skipping spokes wherever desired. This subjects the center of the chain unit to wear.

Figure 2:
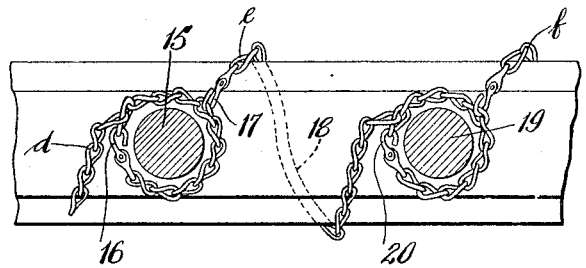
Figs. 2 and 3 are similar views illustrating modifications.

In Fig. 2 a chain unit $d$ has its end looped around a spoke 15 and hooked on itself by hook 16. An adjacent unit $e$ has its hook 17 engaging this loop and is then carried across the wheel tread at 18 and looped around another spoke 19 with its hook 20 engaging an intermediate portion of the unit $e$. The unit $f$ is hooked to the loop around spoke 19 and carried across the tread and around the next spoke in a manner similar to the unit $e$ and so on the chain formation may be carried entirely around the wheel. By this formation either end of the intermediate portion of the chain may be subjected to wear on the tread.

Figure 3:
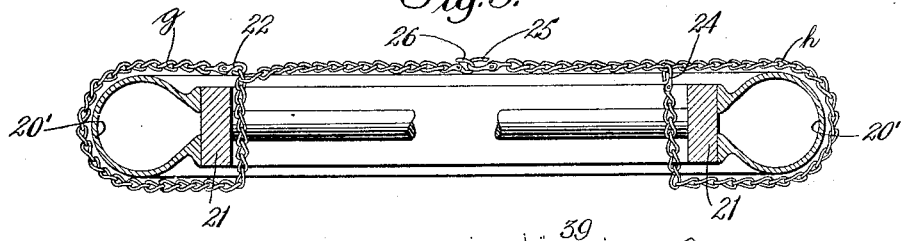

In the form shown in Fig. 3 a unit $g$ is looped around the tire 20' and felloe 21 and has its hook 22 engaging an intermediate link while the other end of the unit is carried toward the hub of the wheel. Another unit $h$ is looped around another portion of the tire and felloe and has its hook 24 similarly engaging an intermediate link of the unit while the other end of the unit has its hook 25 engaging the unit $g$ and the hook 26 of the unit $g$ engages the unit $h$, connection between the units centering near the hub of the wheel. This may be carried out throughout the wheel, the chain units being used in pairs and two positions of wear are provided by simply reversing the unit chains in the assembly end for end.

Figures 4, 5:
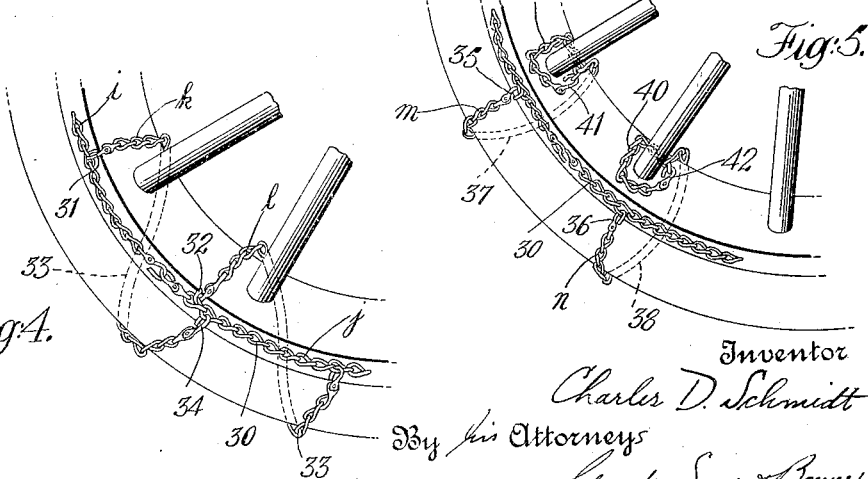
Figs. 4 and 5 are perspective views of portions of wheels illustrating further modifications.

In the form shown in Fig. 4 an endless ring 30 is formed by hooking together units $i$, $j$, etc., end to end. This makes a ring to be used on the side of the wheel. Other units $k$, $l$, etc., are hooked into this ring 30 as at 31, 32 and carried over the tire tread as at 33 and then back between the spokes to be hooked again to the ring as at 34. This gives a semi-floating type of chain with the wear on the center of the chain which extends diagonally across the tread.

In the form shown in Fig. 5 the ring 30 is used as in Fig. 4, but the units $m$, $n$, etc., are hooked to this ring as at 35, 36 and then carried around the tire tread as at 37, 38 and looped around spokes as indicated at 39, 40 with end hooks 41, 42 engaging intermediate links of the units. This gives an anchored device on one side of the wheel and a floating formation on the other side of the wheel with two positions of wear for the units by simply reversing them end for end.

In the structure of this invention the antiskid units are formed into an anti-skid device extending around the wheel and providing wear portions extending across the tread at regular intervals. The device as a whole is prevented from traveling around the tire by the engagement of the chain with the spokes and each individual unit may be used in a variety of combinations so as to present different portions to the wear at the tread.

I claim:—

1. The combination with a vehicle wheel, of an anti-skid device therefor composed of a series of similar connected chain units with hooks at their ends, said assembled sections forming a series of cross chain elements extending across the wheel tread and each unit having a portion looped around a spoke to retain the anti-skid device against travel around the felly of said wheel.

2. An anti-skid device for a vehicle wheel comprising a series of similar simple unbranched chain lengths having intermediate portions crossing the tire tread and their end portions detachably hooked to the next adjacent lengths so as to form a continuous series extending around the wheel and each chain length having a portion looped around a spoke of said wheel.

3. An anti-skid device for a vehicle wheel comprising a series of similar simple unbranched chain lengths crossing the tire tread and having their end portions hooked to the intermediate portion of each next adjacent length so as to form a continuous series extending around the wheel with intermediate portions passing between successive spokes of said wheel.

4. An anti-skid device for a vehicle wheel comprising a set of similar simple unbranched chain lengths with quick detachable fasteners connected thereto, said lengths being assembled on the wheel and fastened to the adjacent lengths so that certain corresponding parts thereof form respective cross members passing across the wheel tread and other corresponding parts thereof are connected together to form said chain lengths into a continuous series passing around the felly of said wheel and between adjacent spokes.

CHARLES D. SCHMIDT